United States Patent [19]

Tsai

[11] Patent Number: 5,354,082
[45] Date of Patent: Oct. 11, 1994

[54] MUDGUARD FOR A BICYCLE

[75] Inventor: Buron Tsai, Taichung Hsien, Taiwan

[73] Assignee: Topeak, Inc., Taichung, Taiwan

[21] Appl. No.: 159,531

[22] Filed: Dec. 1, 1993

[51] Int. Cl.5 .......................................... B62J 15/02
[52] U.S. Cl. ............................ 280/152.1; 280/152.3; 280/852
[58] Field of Search ............... 280/152.1, 152.2, 152.3, 280/852, 288.4, 158.1, 154; D12/186

[56] References Cited

U.S. PATENT DOCUMENTS

| | | | |
|---|---|---|---|
| 541,762 | 6/1895 | Klinck | 280/152.1 |
| 1,024,934 | 4/1912 | Hall | 280/152.1 |
| 1,034,067 | 7/1912 | Birt, Jr. | 280/152.1 |
| 4,319,763 | 3/1982 | White | 280/152.3 |

FOREIGN PATENT DOCUMENTS

| | | | |
|---|---|---|---|
| 2511332 | 2/1983 | France | 280/852 |
| 2614259 | 10/1988 | France | 280/152.3 |
| 2633890 | 1/1990 | France | 280/152.1 |
| 19730 | of 1896 | United Kingdom | 280/152.1 |
| 2229978 | 10/1990 | United Kingdom | 280/152.1 |

*Primary Examiner*—Margaret A. Focarino
*Assistant Examiner*—Carla Mattix
*Attorney, Agent, or Firm*—Morton J. Rosenberg; David I. Klein

[57] ABSTRACT

A mudguard is provided for a bicycle of the type with a brake reinforcing plate which is mounted to a seat stay of the bicycle by a fixing device. The mudguard includes an elongate shell which is arc-shaped in section and has a front end and a rear end. A recess is formed along a longitudinal direction of an underside of the shell. A slot is formed along a transverse direction of the front end of the shell and defines a first panel and a second panel which are parallel to each other. The first panel and the second panel are engaged on the brake reinforcing plate with the brake reinforcing plate at least partially received in the slot. A pair of grooves are formed in a mediate portion of the second panel and extend downwardly, and thus define a flexible snap fastener which has a hook end in a distal end thereof for engaging with an underside of the brake reinforcing plate and for securing the mudguard to the brake reinforcing plate.

1 Claim, 5 Drawing Sheets

MUDGUARD FOR A BICYCLE

BACKGROUND OF THE INVENTION

1. Field of he Invention

The present invention relates to a mudguard for a bicycle, and more particularly to a mudguard for a bicycle of the type with a brake reinforcing plate mounted to a seat stay of the bicycle by a fixing means.

2. Related Prior Art

A conventional mudguard for a bicycle is fixed by the seat post of the bicycle and requires a fixing means to support a rear end of the mudguard, so that it is not easy to be assembled and dismantled.

An improved mudguard is devised, which does not require any fixing means to support the rear end of the mudguard, but the mudguard tends to deflect out of the normal direction.

The present invention has arisen to mitigate and/or obviate the afore-mentioned disadvantages of the conventional mudguards for a bicycle.

SUMMARY OF THE INVENTION

The primary objective of the present invention is to provide a mudguard for a bicycle.

In accordance with one aspect of the present invention, there is provided a mudguard for a bicycle of the type with a brake reinforcing plate which is mounted to a seat stay of the bicycle by a fixing device. The mudguard includes an elongate shell which is arc-shaped in section and has a front end and a rear end. A recess is formed along a longitudinal direction of an underside of the shell. A slot is formed along a transverse direction of the front end of the shell and defines a first panel and a second panel which are parallel to each other. The first panel and the second panel are engaged on the brake reinforcing plate with the brake reinforcing plate at least partially received in the slot. A pair of grooves are formed in a mediate portion of the second panel and extend downwardly, and thus define a flexible snap fastener which has a hook end in a distal end thereof for engaging with an underside of the brake reinforcing plate and for securing the mudguard to the brake reinforcing plate.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
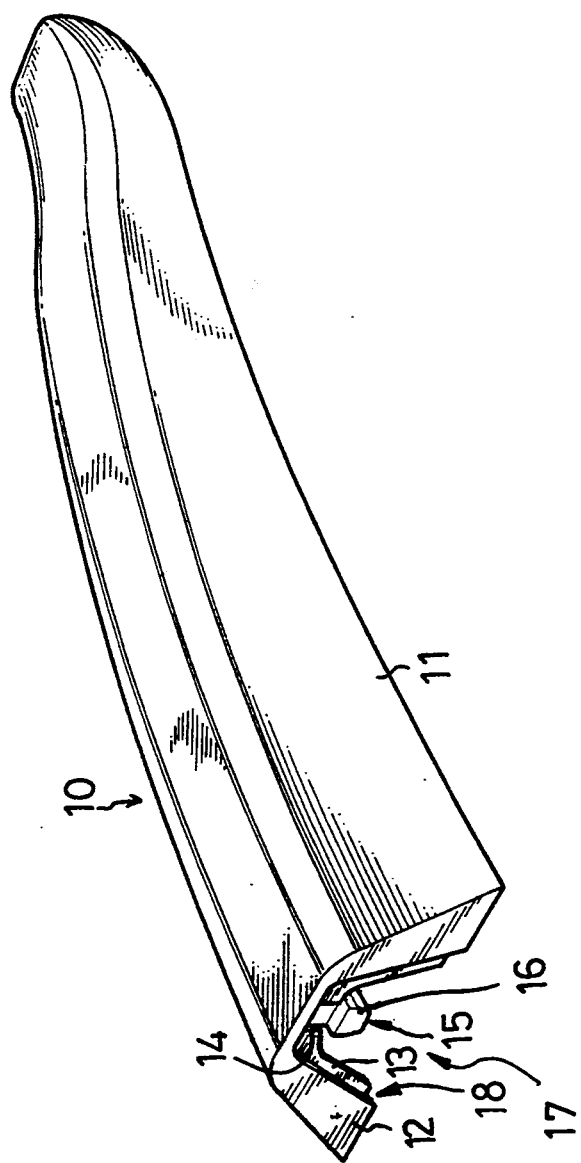
FIG. 1 is a perspective view of a mudguard for a bicycle in accordance with the present invention.
Figure 2:
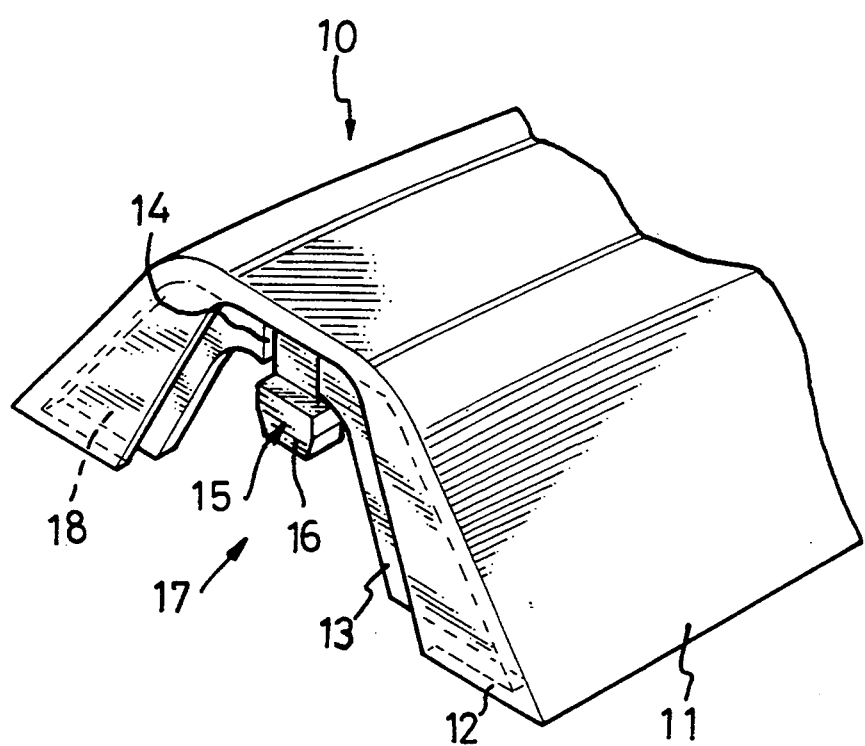
FIG. 2 is a partial enlarged perspective view of the mudguard showing in FIG. 1.
Figure 3:
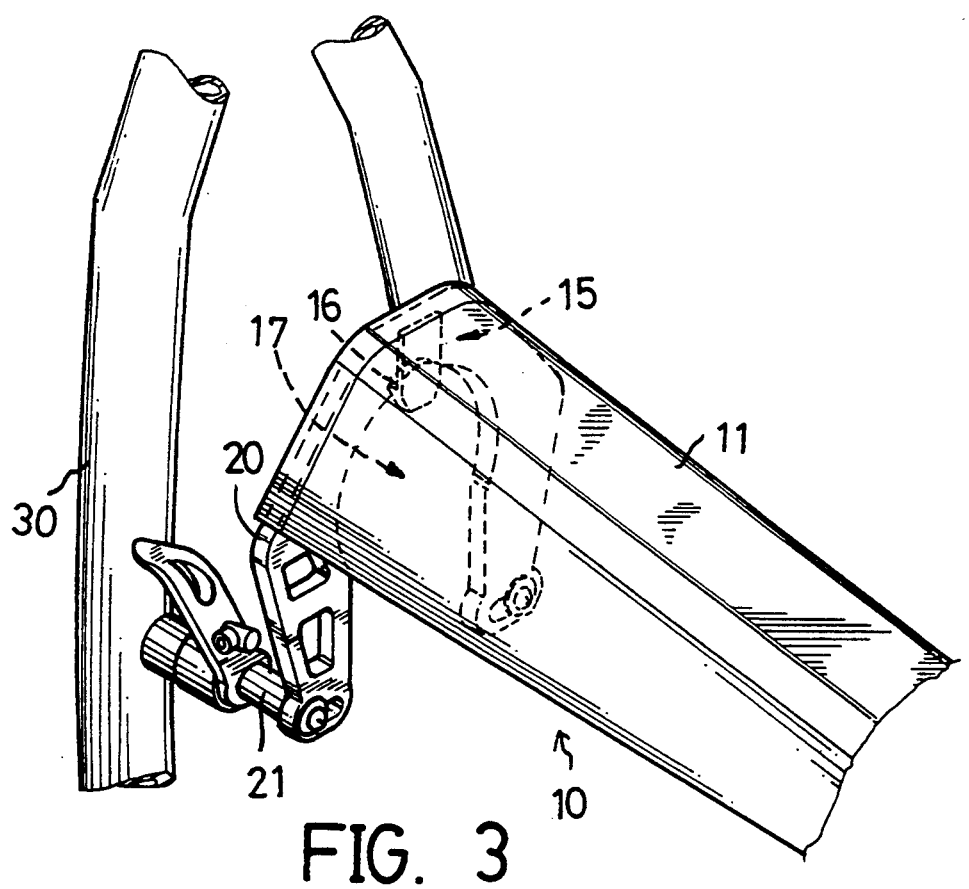
FIG. 3 is a schematic view illustrating engagement of a front end of the mudguard with a brake reinforcing plate of the bicycle.
Figure 4:
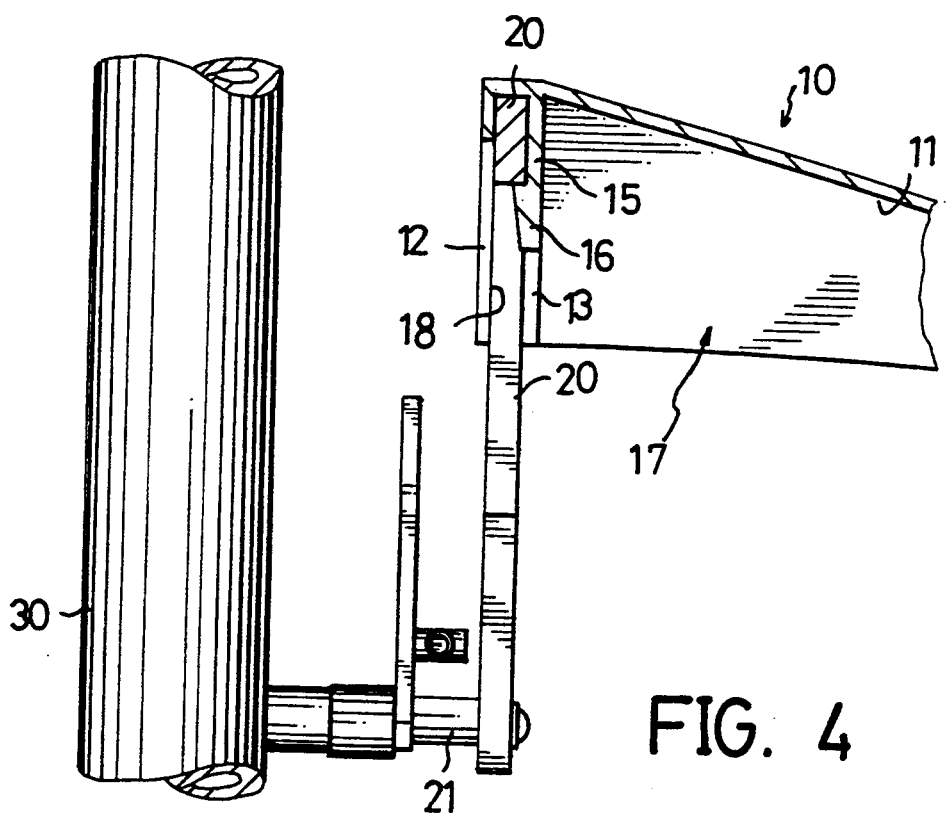
FIG. 4 is a cross-sectional side view of the mudguard, showing the front end of the mudguard securely mounted to the brake reinforcing plate.
Figure 5:
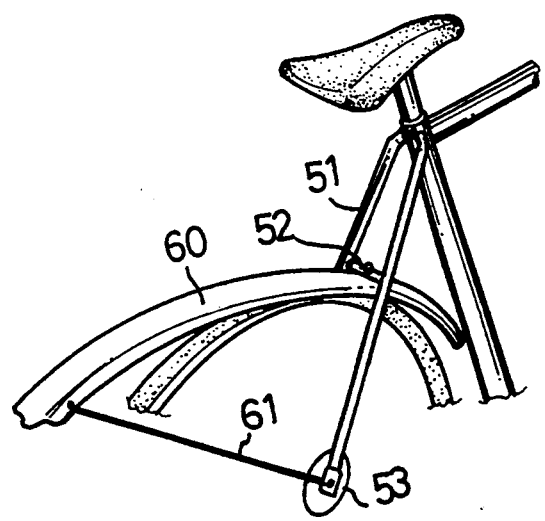
FIG. 5 is a perspective view of a first conventional mudguard for a bicycle.
Figure 6:
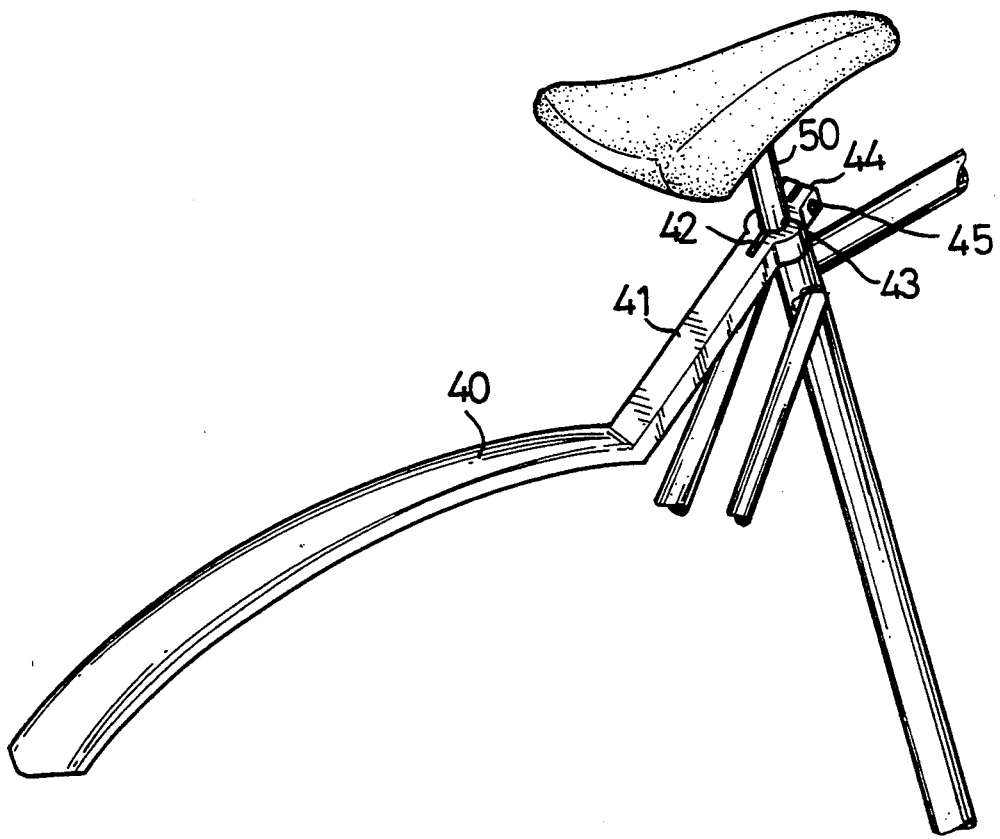
FIG. 6 is a perspective view of a second conventional mudguard for a bicycle.

For a better understanding of the features and benefits of the present invention, reference is made to FIGS. 5 and 6 illustrating conventional mudguards for a bicycle in accordance with the prior art.

Referring to FIG. 5, a first conventional mudguard 60 for a bicycle, which is arc-shaped in section, has a front end, a mediate portion, and a rear end. A latch which protrudes from an upper surface of the mediate portion of the mudguard 60 is threadedly mounted to a bar 52 of a seat stay 51 of the bicycle. A pair of elongate rods 61 are attached substantially parallel to the rear end of the mudguard 60 and are securely mounted to a wheel axle 53 of the bicycle respectively, so as to support the rear end of the mudguard 60. The drawback of such an arrangement is that it is not easy to be assembled and dismantled.

Referring to FIG. 6, a second conventional mudguard 40 for a bicycle, which is arc-shaped in section, has a front end and a rear end. An arm 41 extends outwardly from the front end of the mudguard 40. A circular hole 43 is formed vertically in a distal end of the arm 41. A slit 42 is formed in the distal end along a longitudinal direction of the arm 41, passing through the circular hole 43 and extending outwardly, and thus defining a pair of parallel extensions 44. In operation, the circular hole 43 of the arm 41 is mounted around a seat post 50 of the bicycle. The pair of extensions 44 are coupled by a bolt 45 and thus secure the arm 41 on the seat post 50 of the bicycle, so that the mudguard 40 is secured by engagement of the arm 41 with the seat post 50. Such an arrangement does not require any fixing means to support the rear end of the mudguard 40, but the engagement between the arm 41 and the seat post 50 tends to be loose and thus causes deflection of the mudguard 40 out of its normal direction.

Referring to FIGS. 1-4, a mudguard 10 is provided for a bicycle of the type with a brake reinforcing plate 20 which is mounted to a seat stay 30 of the bicycle by a fixing means 21. The mudguard 10 includes an elongate shell 11 which is arc-shaped in section and has a front end and a rear end. A recess 17 is formed along a longitudinal direction of an underside of the shell 11. A slot 18 is formed along a transverse direction of the front end of the shell 11 and defines a first panel 12 and a second panel 13 which are parallel to each other. The first panel 12 and the second panel 13 are engaged on the brake reinforcing plate 20 with the brake reinforcing plate 20 at least partially received in the slot 18. A pair of grooves 14 are formed in a mediate portion of the second panel 13 and extend downwardly, and thus define a flexible snap fastener 15 which has a hook end 16 in a distal end thereof for engaging with an underside of the brake reinforcing plate 20 so as to secure the mudguard 10 to the brake reinforcing plate 20.

In operation, the pair of panels 12 and 13 are biased against the brake reinforcing plate 20 and are pressed downwardly. In the process of pressing downwardly, the hook end 16 of the flexible snap fastener 15 is biased by the brake reinforcing plate 20 due to the resilient feature of the flexible snap fastener 15. When the hook end 16 reaches the bottom of the brake reinforcing plate 20, it will enter into the underside of the brake reinforcing plate 20 and thus engage therewith so as to fix the mudguard 10 to the brake reinforcing-plate 20.

By such an arrangement, no fixing means is required to support the rear end of the mudguard 10. In addition, it is easy to be assembled and dismantled and does not require the use any tools. Furthermore, the pair of panels 12 and 13, and the hook end 16 of the flexible snap fastener 15 are firmly engaged with the brake reinforcing plate 20 and thus generate a secure engagement, so that the mudguard 10 will not deflect out of its normal direction.

It should be clear to those skilled in the art that further embodiments of the present invention may be made without departing from the teachings of the present invention.

I claim:

1. A mudguard for a bicycle of the type with a brake reinforcing plate mounted to a seat stay of said bicycle by a fixing means, said mudguard comprising:

an elongate shell which is arc-shaped in section and has a front end and a rear end, a recess being formed along a longitudinal direction of an underside of said shell, a slot being formed along a transverse direction of said front end of said shell and defining a first panel and a second panel which are parallel to each other, said first panel and said second panel being engaged on said brake reinforcing plate with said brake reinforcing plate at least partially received in said slot, and a pair of grooves being formed in a mediate portion of said second panel and extending downwardly, and thus defining a flexible snap fastener which has a hook end in a distal end thereof for engaging with an underside of said brake reinforcing plate and for securing said mudguard to said brake reinforcing plate.

* * * * *